C. W. McMURRY.
Cotton-Scraper.
No. 196,244.　　　　Patented Oct. 16, 1877.
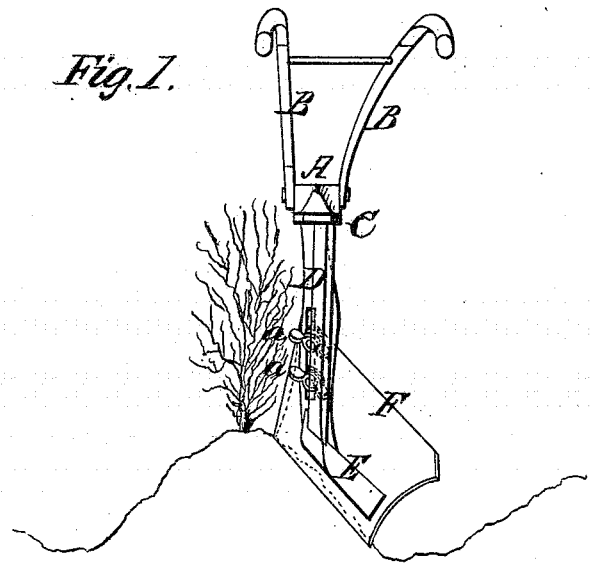
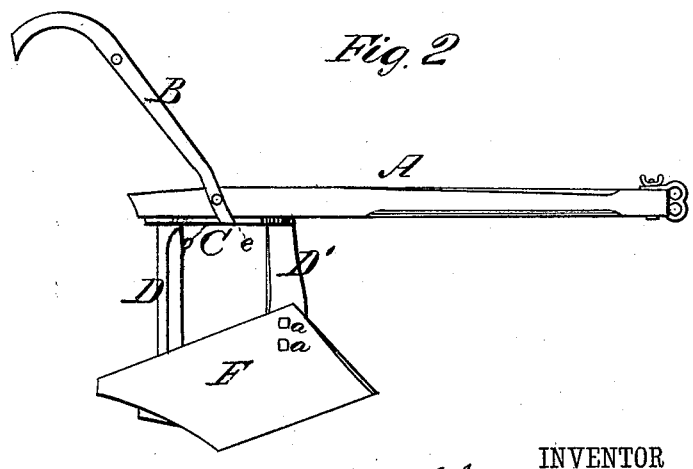

C. W. McMURRY.
Cotton-Scraper.
No. 196,244.  Patented Oct. 16, 1877.
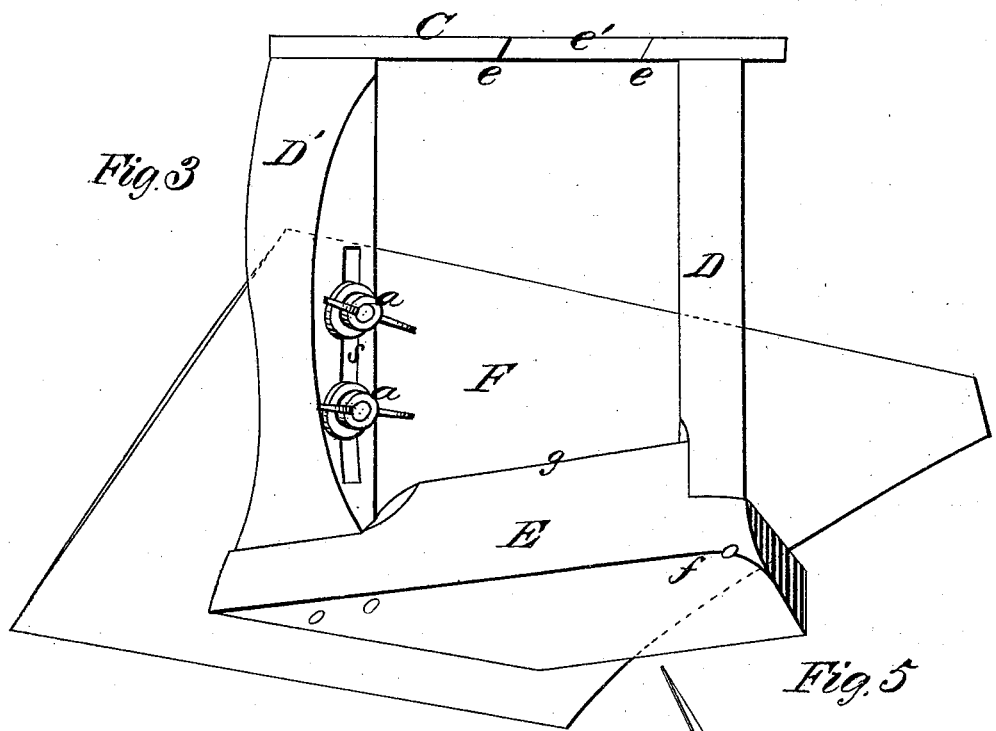
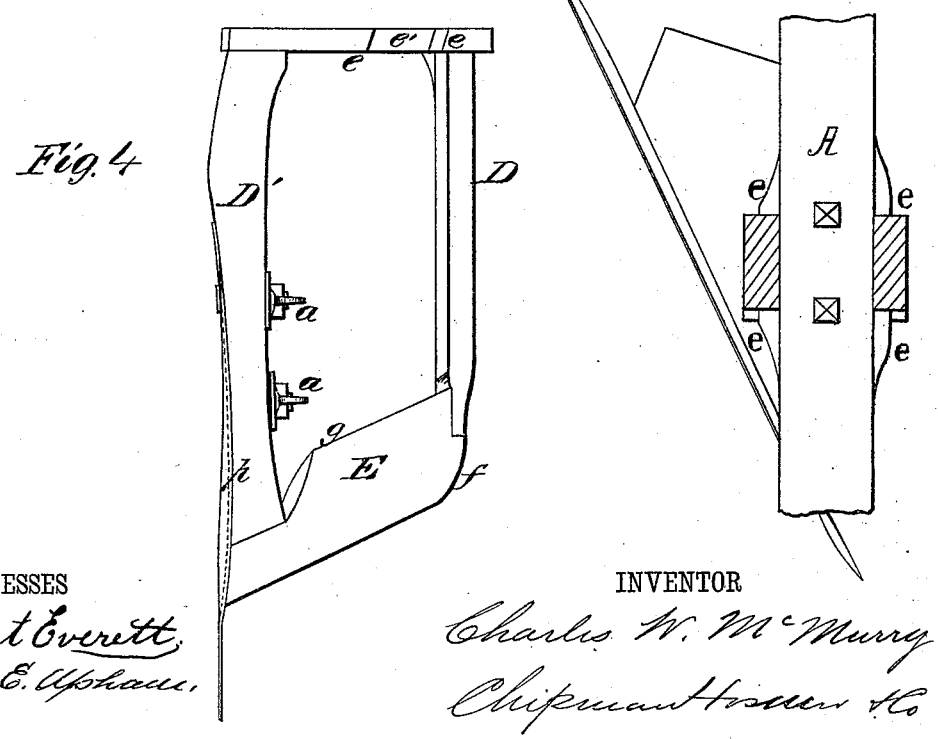
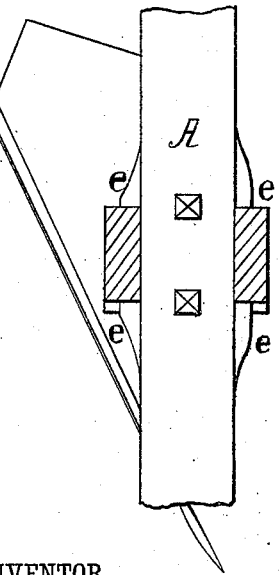
WITNESSES
Robert Everett,
Geo. E. Upham.
INVENTOR
Charles W. McMurry
Chipman Hosmer &Co
Attorneys

UNITED STATES PATENT OFFICE.

CHARLES W. McMURRY, OF GADSDEN, TENNESSEE.

IMPROVEMENT IN COTTON-SCRAPERS.

Specification forming part of Letters Patent No. 196,244, dated October 16, 1877; application filed July 11, 1874.

*To all whom it may concern:*

Be it known that I, CHARLES W. MCMURRY, of Gadsden, in the county of Madison and State of Tennessee, have invented a new and valuable Improvement in the Mitchell cotton-scraper; and I do hereby declare that the following is a full, clear, and exact description of the construction and operation of the same, reference being had to the annexed drawings, making a part of this specification, and to the letters and figures of reference marked thereon.

Figure 1 of the drawing is a representation of a rear view of my cotton-scraper. Fig. 2 is a side view of the same. Figs. 3, 4, and 5 are detail views of the same.

This invention has relation to implements for scraping cotton-ridges and throwing the earth and weeds in the center of the furrow preparatory to the use of the hoe.

My object is to improve the cotton-scraper for which Letters Patent were granted to Jonathan H. Mitchell on the 13th day of September, 1859, first, by constructing the chair-bar of the standard-frame with ears on each side of it, for the purpose of receiving the lower ends of the handles and affording substantial stays therefor; second, by beveling, sloping, and rounding the land-side edge of the sole-plate, in such manner as to prevent bruising the young cotton or cutting too deeply into the earth about the roots of the plants, as will be hereinafter explained.

In the annexed drawings, A designates the beam of the scraper, and B the handles thereof. The standard-frame consists of a horizontal chair-bar, C, a front bar, D', and a rear or heel bar, D, which two last-named bars are rigidly secured to a laterally-inclined sole-plate, E. The chair-bar C, on which the beam A is bolted, is constructed with ears $e\ e$ on its edges, between which ears are inclined passages $e'$, to receive the lower ends of the handles B. The ears serve as stays to the handles, and also afford guides, by which the "stocker" can quickly and accurately adjust the handles. The front upright bar D' is beveled, so that it presents a sharp front edge, and through this bar D' a slot, $s$, is made vertically, to receive two straight bolts, $a\ a$, that pass through the scraper-blade F, and have nuts applied on them, by which the blade F is secured to the standard-frame, and allowed to be adjusted up or down, as circumstances require.

The sole-plate E is of a triangular form in a horizontal view, and it is set at such an angle with respect to the bars D D' that when it lies on the side of a ridge of cotton the bars D D' will assume an upright position. This allows the sole-plate to lie closely upon the side of a ridge and run smoothly thereon.

The land-side edge of the sole-plate is rounded, as shown at $f$, and thickened by a longitudinal flange, $g$. (Shown in Figs. 2 and 3.) This prevents the sole-plate from injuring the cotton-plants or digging too deeply about their roots.

The scraper is of a rhomboidal form, and its front edge is bent outwardly, as at $p$, Fig. 4, so that it will not cut or injure the plants, and so that it will aid in throwing the earth and weeds into the center of the furrow.

I am fully aware that cotton-scrapers have been adjustably connected to a frame attached to the under side of a beam; and I do therefore not claim such as being my invention.

What I claim as new, and desire to secure by Letters Patent, is—

In a cotton-scraper, the frame for supporting the scraper, constructed of the top beam C, having ears $e\ e$, with inclined slots $e'$, the rear upright D, the slotted and sharp-edged upright D', and the inclined triangular sole-plate E, having its land-side edge rounded, as shown at $f$, and thickened by the longitudinal flange $g$, all substantially as and for the purposes herein set forth.

In testimony that I claim the above I have hereunto subscribed my name in the presence of two witnesses.

CHARLES W. McMURRY.

Witnesses:
W. B. SEWARD,
THALES E. KOONE.